United States Patent
Ge

(10) Patent No.: US 9,047,456 B2
(45) Date of Patent: Jun. 2, 2015

(54) SYSTEM AND METHOD FOR CONTROLLING ACCESS TO A RESOURCE

(75) Inventor: Jiuyuan Ge, Centereach, NY (US)

(73) Assignee: Canon Information and Imaging Solutions, Inc., Melville, NY (US)

(*) Notice: Subject to any disclaimer, the term of this patent is extended or adjusted under 35 U.S.C. 154(b) by 27 days.

(21) Appl. No.: 13/425,160

(22) Filed: Mar. 20, 2012

(65) Prior Publication Data

US 2013/0254848 A1    Sep. 26, 2013

(51) Int. Cl.
*G06F 7/04* (2006.01)
*G06F 17/30* (2006.01)
*G06F 15/16* (2006.01)
*H04L 29/06* (2006.01)
*G06F 21/33* (2013.01)

(52) U.S. Cl.
CPC ...... *G06F 21/335* (2013.01); *G06F 2221/2137* (2013.01); *H04L 63/0807* (2013.01); *H04L 63/168* (2013.01)

(58) Field of Classification Search
CPC .......................... H04L 9/3213; H04L 63/0807
USPC ...................................... 726/2–21
See application file for complete search history.

(56) References Cited

U.S. PATENT DOCUMENTS

| | | | |
|---|---|---|---|
| 5,742,768 A | 4/1998 | Gennaro et al. | |
| 6,446,111 B1 | 9/2002 | Lowery | |
| 6,678,731 B1 | 1/2004 | Howard et al. | |
| 7,395,424 B2 | 7/2008 | Ashley et al. | |
| 7,421,731 B2 | 9/2008 | Mitchell et al. | |
| 7,440,962 B1 | 10/2008 | Wong et al. | |
| 7,672,938 B2 | 3/2010 | Hawkins | |
| 7,805,670 B2 | 9/2010 | Lipton et al. | |
| 7,886,341 B2 | 2/2011 | Lin et al. | |
| 7,890,487 B1 | 2/2011 | Hess et al. | |
| 7,920,149 B2 | 4/2011 | Hertzfeld | |
| 8,024,779 B2 | 9/2011 | John et al. | |
| 2002/0120867 A1* | 8/2002 | Mitchell et al. | 713/201 |
| 2002/0150253 A1* | 10/2002 | Brezak et al. | 380/281 |
| 2003/0005117 A1* | 1/2003 | Kang et al. | 709/225 |
| 2003/0018913 A1* | 1/2003 | Brezak et al. | 713/201 |
| 2003/0131115 A1* | 7/2003 | Mi et al. | 709/229 |

(Continued)

OTHER PUBLICATIONS

Bruce Schneier, Applied Cryptography, Nov. 2, 1995, p. 475.*

(Continued)

*Primary Examiner* — Andrew Nalven
*Assistant Examiner* — Khang Do
(74) *Attorney, Agent, or Firm* — Canon U.S.A., Inc. IP Division

(57) ABSTRACT

Methods, devices, and computer-readable storage media are provided. In some embodiments, a server receives from a browser on a client a request to access a first web page. In response to receiving the request, the server sends to the client a second web page including an embedded executable program configured to run within the browser on the client, wherein the embedded executable program, when executed on the client, is operable to obtain a ticket-granting ticket stored on the client and send the ticket-granting ticket to the server. The server receives the ticket-granting ticket from the embedded executable program on the client. Furthermore, the server determines whether a user associated with the ticket-granting ticket is authorized to access the first web page. In response to determining that the user is authorized to access the first web page, the server grants the requested access to the first web page.

21 Claims, 8 Drawing Sheets

(56) References Cited

U.S. PATENT DOCUMENTS

| | | | |
|---|---|---|---|
| 2005/0015442 | A1 | 1/2005 | O'Laughlen et al. |
| 2006/0031940 | A1 | 2/2006 | Rozman et al. |
| 2006/0190736 | A1* | 8/2006 | John et al. .................... 713/182 |
| 2007/0087368 | A1 | 4/2007 | Loraine et al. |
| 2007/0288992 | A1 | 12/2007 | Robinson et al. |
| 2008/0016170 | A1 | 1/2008 | MacKelprang et al. |
| 2008/0196084 | A1 | 8/2008 | Hawkes |
| 2008/0275961 | A1* | 11/2008 | Hoshino et al. .............. 709/217 |
| 2009/0112789 | A1* | 4/2009 | Oliveira et al. ................... 707/1 |
| 2009/0210293 | A1 | 8/2009 | Steele et al. |
| 2009/0241166 | A1 | 9/2009 | Thurm et al. |
| 2009/0241173 | A1 | 9/2009 | Troyansky |
| 2009/0265772 | A1 | 10/2009 | Hitchcock et al. |
| 2010/0024013 | A1 | 1/2010 | Cheng et al. |
| 2010/0050247 | A1* | 2/2010 | Hashimoto ..................... 726/10 |
| 2010/0161717 | A1 | 6/2010 | Albrecht et al. |
| 2010/0242107 | A1* | 9/2010 | Kanou et al. .................... 726/16 |
| 2010/0287235 | A1 | 11/2010 | Blakley, III et al. |
| 2010/0312821 | A1 | 12/2010 | Bannoura et al. |
| 2011/0078437 | A1 | 3/2011 | Reddy |
| 2011/0093474 | A1 | 4/2011 | Etchegoyen |
| 2011/0173256 | A1 | 7/2011 | Khalatian |
| 2011/0252478 | A1 | 10/2011 | Hubbard et al. |
| 2011/0265166 | A1 | 10/2011 | Franco et al. |
| 2012/0260329 | A1* | 10/2012 | Suffling ............................ 726/9 |

OTHER PUBLICATIONS

The Blog of Warren Strange, 2009, downloaded from wstrange.wordpress.com/page/2/ on May 4, 2011.

JFileUpload, Jan. 2011, downloaded from www.jfileupload.com/products/jfileupload/ on May 3, 2011.

Panarmenian.net, Cybercriminals began using new malware program to steal from online bank accounts, Feb. 23, 2011, downloaded from http://www.panarmenian.net/eng/it_telecom/news/62266/, on May 3, 2011.

Canon, Authorized Send Distribute and Share Your Ideas Effectively and Securely, 2008, retrieved from https://www.imageware.com/register/Spyder/downloads//DownloadBrochures/copier_authorized_send.pdf on Mar. 20, 2012.

Daren Matthews, How Kerberos Works, Nov. 9, 2010, retrieved from http://mccltd.net/blog/?p=1053 on Mar. 20, 2012.

David Chappell, Digital Identity for .NET Applications: A Technology Overview, 2007, retrieved from http://msdn.microsoft.com/en-us/library/bb882216.aspx on Mar. 20, 2012.

Jeremy, Introduction to Active Directory, Jul. 2008, retrieved from http://learnthat.com/2008/07/introduction-to-active-directory/ on Mar. 20, 2012.

Microsoft Technet, Active Directory Users, Computers, and Groups retrieved from http://technet.microsoft.com/en-us/library/bb727067.aspx on Mar. 20, 2012.

How the Kerberos Version 5 Authentication Protocol Works, Oct. 7, 2009, retrieved from http://technet.microsoft.com/en-us/library/cc772815(WS.10).aspx on Mar. 20, 2012.

How Active Directory Searches Work, May 7, 2010, retrieved from http://technet.microsoft.com/en-us/library/cc755809(WS.10).aspx on Mar. 20, 2012.

How Access Tokens Work, Mar. 28, 2003, retrieved from http://technet.microsoft.com/en-us/library/cc783557(WS.10).aspx on Mar. 20, 2012.

Technet Magazine, Tip:Understand Implicit Groups and Identities in Windows Server 2008, retrieved from http://technet.microsoft.com/en-us/magazine/dd637754.aspx on Mar. 20, 2012.

* cited by examiner

SYSTEM AND METHOD FOR CONTROLLING ACCESS TO A RESOURCE

BACKGROUND OF THE INVENTION

1. Field of the Invention

The present invention relates generally to access control, and more particularly to a system and method for controlling access to a resource.

2. Description of the Related Art

Modern computing systems often employ security measures to control access to protected resources. For example, a computing system may implement authentication and authorization processes in order to prevent unauthorized entities from accessing a protected resource. Authentication may include the computing system prompting an entity to provide a credential in order to verify the entity's identity. The authentication may be based on a username and password, a smart card and personal identification number (PIN), or other information associated with the entity. Authorization may include the computing system checking attribute information of the entity in order to verify that the entity is authorized to access the requested resource. For example, the computing system may grant or deny access to a resource based on whether the attribute information of the requesting entity satisfies predefined criteria.

A management system may be employed to manage information, such as user accounts and their associated attributes, and security processes, such as authentication and authorization processes. The computing system or application that provides the protected resource may include such a management system. That is, the computing system or application may manage the information and security processes locally using its own management system dedicated to one or more resources the computing system provides. Alternatively, the computing system or application that provides the protected resource may use a centralized management system.

A centralized management system may provide, among other things, information management and authentication services for various entities on a network. If the protected resource is on the network, then an administrator or other party responsible for managing the protected resource may choose to use the centralized management system for authenticating and authorizing users rather than create and/or use a separate local management system dedicated to one or more local resources.

SUMMARY OF THE INVENTION

Methods, systems, and computer-readable storage media for controlling access to a resource are disclosed.

Some embodiments of the invention include receiving at a server computing system from a browser on a client computing system a request to access a first web page. In response to the receiving the request, the server computing system sends to the client computing system a second web page including an embedded executable program configured to run within the browser on the client computing system, wherein the embedded executable program, when executed on the client computing system, is operable to obtain a ticket-granting ticket stored on the client computing system and send the ticket-granting ticket to the server computing system. The server computing system receives from the embedded executable program on the client computing system the ticket-granting ticket. Furthermore, the server computing system determines whether a user associated with the ticket-granting ticket is authorized to access the first web page. In response to determining that the user is authorized to access the first web page, the server computing system grants the requested access to the first web page.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
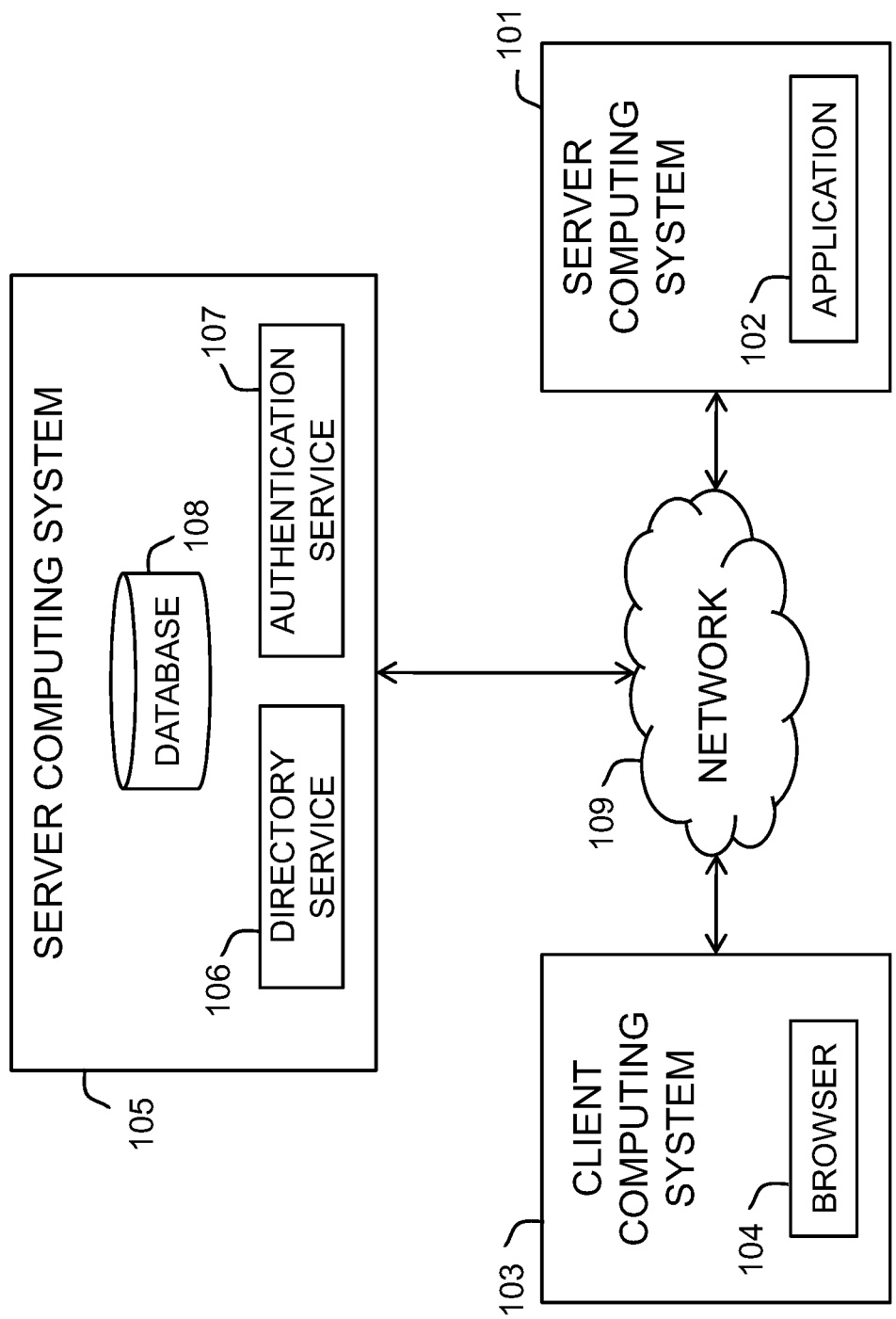
FIG. 1 illustrates an example network environment.

Embodiments of the present invention are described with reference to the drawings. FIG. 1 illustrates an example network environment. A server computing system 101 having an application 102, a client computing system 103 having a browser 104, and a server computing system 105 having a directory service 106, an authentication service 107, and a database 108 are connected to a network 109.

The server computing system 101 includes hardware, software, or both for providing the functionality of the server computing system 101. The server computing system 101 may include one or more servers. For example, the server computing system 101 may include one or more web servers, application(s) servers, fax servers, file servers, mail servers, or print servers. In some embodiments, the server computing system 101 is unitary. In some embodiments, the server computing system 101 is distributed. The server computing system 101 may span multiple locations. The server computing system 101 may span multiple machines.

In some embodiments, the server computing system 101 performs one or more steps of one or more methods described or illustrated herein. In some embodiments, the server computing system 101 provides functionality described or illustrated herein. In some embodiments, software running on the server computing system 101 performs one or more steps of one or more methods described or illustrated herein or provides functionality described or illustrated herein. Particular embodiments include one or more portions of the server computing system 101.

The server computing system 101 provides access to the application 102. The application 102 includes programs and related data. In some embodiments, the application 102 executing on the server computing system 101 performs one or more steps of one or more methods described or illustrated herein or provides functionality described or illustrated herein. By way of example and not by way of limitation, programs of the application 102 may include instructions which, when executed by one or more processors, cause the one or more processors to perform one or more operations described with respect to FIG. 5 and/or FIG. 6.

In some embodiments, the application 102 executing on the server computing system 101 provides web server functionality. The application 102 may include one or more programs for receiving hypertext transfer protocol (HTTP) requests and providing HTTP responses. For example, the application 102 may serve content in the form of a web page in response to a request from a web browser. The web page may be static or dynamic and may comprise Hyper Text Markup Language (HTML) files, or other suitable files, executable programs, form elements, images, or other content. One or more elements of the web page content may be stored at the server computing system 101. In some embodiments, one or more of the web pages are configuration web pages for configuring the application 102. The application 102 may include one or more programs for controlling access to one or more of the web pages.

In some embodiments, the application 102 executing on the server computing system 101 provides task-specific functionality. For example, the application 102 may include one or more programs enabling a user to perform one or more tasks. By way of example, and not by way of limitation, the application 102 may provide various functions, features and user interfaces for processing image data, transmitting data over a network, managing one or more databases, or other tasks. In some embodiments, the application 102 is configured to use one or more resources of an image processing device to perform an operation in response to an instruction from a user. For example, the application 102 may use functionality of and/or information on the image processing device to carry out an operation. The application 102 may include one or more programs for controlling access to one or more resources of the application 102, including the task-specific functionality of the application 102.

In some embodiments, the application 102 may be configured to control access to various resources of the application 102 according to a predetermined policy. In some embodiments, access to one or more resources of the application 102 is controlled based on one or more criteria, and access to one or more other resources of the application 102 is controlled based on one or more different criteria. By way of example, and not by way of limitation, a user may be required to belong to an administrator group in order to access a resource for configuring the application 102, such as a web page for modifying configuration settings of the application 102; but the user may not be required to belong to the administrator group in order to access some task-specific functionality of the application 102. Policies for controlling access to various resources of the application 102 may be stored at the server computing system 101.

The client computing system 103 includes hardware, software, or both for providing the functionality of the client computing system 103. In some embodiments, the client computing system 103 is unitary. In some embodiments, the client computing system 103 is distributed. The client computing system 103 may span multiple locations. The client computing system 103 may span multiple machines. The browser 104 may execute on the client computing system 103.

The browser 104 may be a web browser such as MICROSOFT INTERNET EXPLORER or MOZILLA FIREFOX, and may be used to access a resource, such as a web page. The browser 104 may enable a user to display and interact with text, images, form elements, or other information typically located on a web page served by a web server on the World Wide Web or a local area network. The browser 104 may support various types of downloadable, executable, software modules, such as applets or plug-ins. For example, the browser 104 may incorporate a virtual machine configured to execute a program, such as a JAVA applet, embedded in a web page accessed by the browser 104. The client computing system 103 may have various add-ons, plug-ins, or other extensions for use in or with the browser 104.

The server computing system 105 includes hardware, software, or both for providing the functionality of the server computing system 105. The server computing system 105 may include one or more servers. For example, the server computing system 105 may include one or more application(s) servers, name servers, file servers, database servers, mail servers, or web servers. In some embodiments, the server computing system 105 is unitary. In some embodiments, the server computing system 105 is distributed. The server computing system 105 may span multiple locations. The server computing system 105 may span multiple machines.

The server computing system 105 may provide network services for entities within the network 109. In some embodiments, the server computing system 105 provides centralized management of account information and security processes for entities within the network 109. Examples of network services the server computing system 105 may provide include directory services, authentication services, naming services, and secure access to resources on the network 109. The server computing system 105 may provide one or more network services for network entities, such as the server computing system 101, the client computing system 103, or users within the network 109.

The server computing system 105 includes the directory service 106, the authentication service 107, and the database 108. These components of the server computing system 105 reside in the server computing system 105 in any suitable manner. For example, these components may reside on one or multiple servers. In some embodiments, one or more of these components may be provided as part(s) of a software application. In some embodiments, one or more of these components may be provided as a stand-alone software application.

The directory service 106 may be used for maintaining and accessing information stored in the database 108. In some embodiments, the directory service 106 uses Lightweight Directory Access Protocol (LDAP) to interact with information in the database 108. The directory service 106 may perform various operations with respect to the database 108. Examples of operations include adding entries to the database 108; deleting entries from the database 108; modifying entries in the database 108; searching for entries in the database 108; and retrieving entries from the database 108.

In some embodiments, information stored in the database 108 is organized into a hierarchy of objects. Each object may represent an entity within the network 109. By way of example, entities within the network 109 may be users, computing devices, applications, services, groups, or other suitable entities. In some embodiments, each object has a unique identifier and contains a set of attributes. Attributes for a user account, for example, may include the user's password or other credential, or group membership information indicating a group to which the user belongs, such as an administrator group. Objects may be grouped in any suitable manner, such as into domains or further into units within a domain; and may be grouped for any suitable reason, such as for ease of administration in applying group policies, or to correspond to an organization's structure.

The authentication service 107 may be used to authenticate network entities seeking access to resources on the network 109. In some embodiments, the authentication service 107 uses the Kerberos protocol to authenticate network entities. The authentication service 107 may comprise a key distribution center (KDC). In response to a service request, the authentication service 107 may access account information of the entity that sent the service request. In some embodiments, the account information comprises an object and its attributes stored in the database 108.

In some embodiments, an LDAP-compliant directory service is running on the server computing system 105. In some embodiments, ACTIVE DIRECTORY is running on the server computing system 105. In some embodiments, the server computing system 101, the client computing system 103, and the server computing system 105 belong to the same domain and access to resources within the domain is controlled by the server computing system 105.

The network 109 couples one or more servers and one or more clients to each other. The network 109 may be any suitable network. For example, one or more portions of the network 109 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 109 may include one or more networks.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

Figure 2:
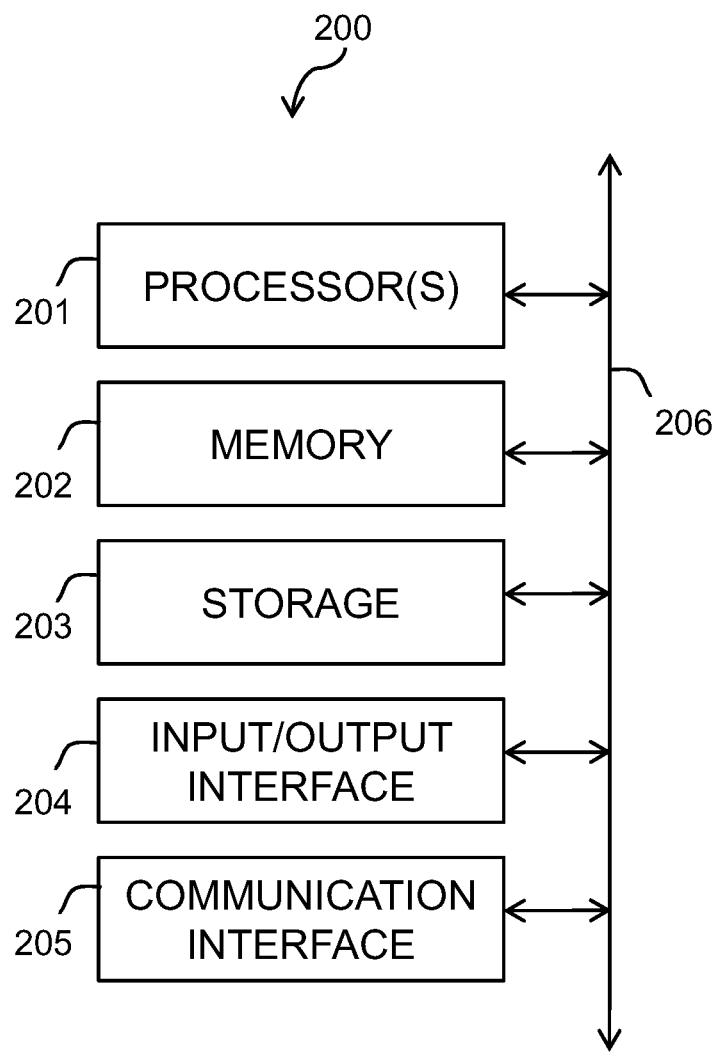
FIG. 2 illustrates an example computing system.

FIG. 2 illustrates an example computing system 200. According to various embodiments, all or a portion of the description of the computing system 200 is applicable to all or a portion of one or more of the server computing system 101, the client computing system 103, and the server computing system 105.

In some embodiments, the computing system 200 performs one or more steps of one or more methods described or illustrated herein. In some embodiments, the computing system 200 provides functionality described or illustrated herein. In some embodiments, software running on the computing system 200 performs one or more steps of one or more methods described or illustrated herein or provides functionality described or illustrated herein. Some embodiments include one or more portions of the computing system 200.

The computing system 200 includes one or more processor(s) 201, memory 202, storage 203, an input/output (I/O) interface 204, a communication interface 205, and a bus 206. The computing system 200 may take any suitable physical form. For example, and not by way of limitation, the computing system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The processor(s) 201 include hardware for executing instructions, such as those making up a computer program. The processor(s) 201 may retrieve the instructions from the memory 202, the storage 203, an internal register, or an internal cache. The processor(s) 201 then decode and execute the instructions. Then, the processor(s) 201 write one or more results to the memory 202, the storage 203, the internal register, or the internal cache. The processor(s) 201 may provide the processing capability to execute the operating system, programs, user and application interfaces, and any other functions of the computing system 200.

The processor(s) 201 may include a central processing unit (CPU), one or more general-purpose microprocessor(s), application-specific microprocessor(s), and/or special purpose microprocessor(s), or some combination of such processing components. The processor(s) 201 may include one or more graphics processors, video processors, audio processors and/or related chip sets.

In some embodiments, the memory 202 includes main memory for storing instructions for the processor(s) 201 to execute or data for the processor(s) 201 to operate on. By way of example, the computing system 200 may load instructions from the storage 203 or another source to the memory 202. During or after execution of the instructions, the processor(s) 201 may write one or more results (which may be intermediate or final results) to the memory 202. One or more memory buses (which may each include an address bus and a data bus) may couple the processor(s) 201 to the memory 202. One or more memory management units (MMUs) may reside between the processor(s) 201 and the memory 202 and facilitate accesses to the memory 202 requested by the processor(s) 201. The memory 202 may include one or more memories. The memory 202 may be random access memory (RAM).

The storage 203 stores data and/or instructions. As an example and not by way of limitation, the storage 203 may include a hard disk drive, a floppy disk drive, flash memory, an optical disc, a magneto-optical disc, magnetic tape, or a Universal Serial Bus (USB) drive or a combination of two or more of these. In some embodiments, the storage 203 is a removable medium. In some embodiments, the storage 203 is a fixed medium. In some embodiments, the storage 203 is internal to the computing system 200. In some embodiments, the storage 203 is external to the computing system 200. In some embodiments, the storage 203 is non-volatile, solid-state memory. In some embodiments, the storage 203 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 203 may include one or more memory devices.

One or more program modules stored in the storage 203 may be configured to cause various operations and processes described herein to be executed. For example, the storage 203 may store instructions for generating and providing to a computing system a web page including an embedded executable program which, when executed on the computing system, is operable to obtain a ticket-granting ticket stored on the computing system and send the ticket-granting ticket to another computing system; determining whether a user associated with the ticket-granting ticket is authorized to access a protected resource comprising a web page; or a combination of these, in accordance with embodiments described herein.

The I/O interface 204 includes hardware, software, or both providing one or more interfaces for communication between the computing system 200 and one or more I/O devices. The computing system 200 may include one or more of these I/O devices, where appropriate. One or more of these I/O devices may enable communication between a person and the computing system 200. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 204 includes one or more device or software drivers enabling the processor(s) 201 to drive one or more of these I/O devices. The I/O interface 204 may include one or more I/O interfaces.

The communication interface 205 includes hardware, software, or both providing one or more interfaces for communication (such as, for example, packet-based communication) between the computing system 200 and one or more other computing systems or one or more networks. As an example and not by way of limitation, the communication interface 205 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 205 for it. As an example and not by way of limitation, the computing system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 200 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 200 may include any suitable communication interface 205 for any of these networks, where appropriate. The communication interface 205 may include one or more communication interfaces 205.

The bus 206 interconnects various components of the computing system 200 thereby enabling the transmission of data and execution of various processes. The bus 206 may include one or more types of bus structures including a memory bus or memory controller, a peripheral bus, and a local bus using any of a variety of bus architectures.

Figure 3:
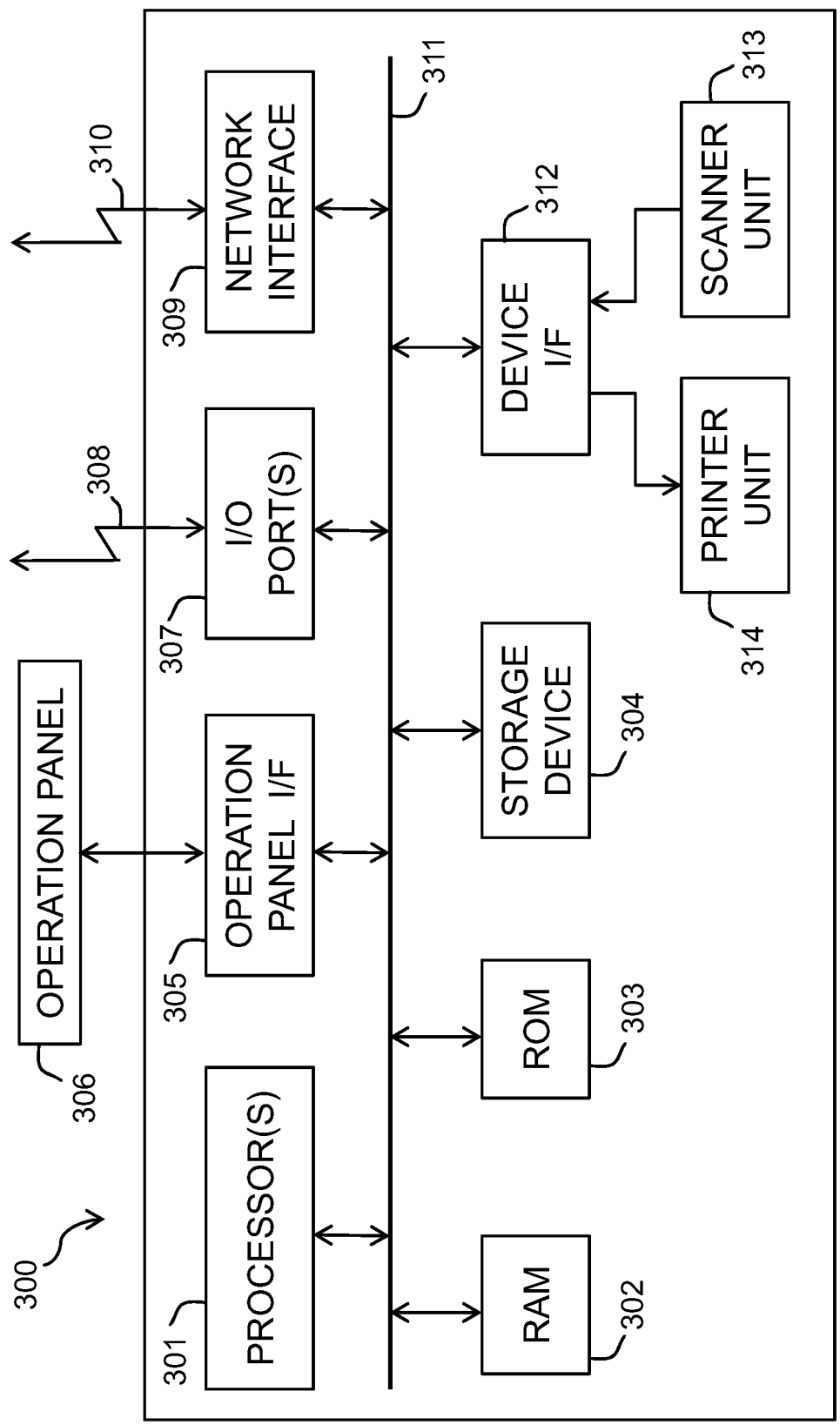
FIG. 3 illustrates an example image processing device.

FIG. 3 illustrates an example image processing device 300. In some embodiments, the image processing device 300 includes the server computing system 101 of FIG. 1. For example, in some embodiments, the server computing system 101 is embedded in the image processing device 300. In some embodiments, the server computing system 101 of FIG. 1 comprises the image processing device 300.

The image processing device 300 of FIG. 3 is a multifunction peripheral having scanning, printing, copying, and other functions. However, it will be understood that various other implementations of an image processing device are within the scope of the present invention. For example, various components, modules, functions, and/or configurations of the image processing device 300 of FIG. 3 could be combined, deleted, or modified to form further implementations.

In some embodiments, the image processing device 300 performs one or more steps of one or more methods described or illustrated herein. In some embodiments, the image processing device 300 provides functionality described or illustrated herein. In some embodiments, software running on the image processing device 300 performs one or more steps of one or more methods described or illustrated herein or provides functionality described or illustrated herein. Particular embodiments include one or more portions of the image processing device 300.

The image processing device 300 includes one or more processor(s) 301. The processor(s) 301 include a central processing unit (CPU) that performs overall control functions for the image processing device 300. The CPU uses a random access memory (RAM) 302 as a work area while executing instructions. The CPU executes instructions of various programs stored in one or more memory devices. For example, the CPU executes programs stored in a read only memory (ROM) 303 and in a storage device 304.

In some embodiments, the processor(s) 301 include one or more processors in addition to the CPU. By way of example, the processor(s) 301 may include one or more general-purpose microprocessor(s), application-specific microprocessor(s), and/or special purpose microprocessor(s). Additionally, in some embodiments the processor(s) 301 may include one or more internal caches for data or instructions.

The processor(s) 301 provide the processing capability required to execute an operating system, application programs, and various other functions provided on the image processing device 300. The processor(s) 301 perform or cause components of the image processing device 300 to perform various operations and processes described herein, in accordance with instructions stored in one or more memory devices.

The RAM 302 is used as a work area when the processor(s) 301 execute various instructions, such as those making up computer programs stored in the ROM 303 and/or the storage device 304. The RAM 302 may be used as a temporary storage area for various data, including input image data. The RAM 302 may be used as a cache memory. In some embodiments, the RAM may be dynamic RAM (DRAM) or static RAM (SRAM).

The ROM 303 stores data and programs having computer-executable instructions for execution by the processor(s) 301. In some embodiments, the ROM 303 is a boot ROM, storing instructions for the booting process. In some embodiments, the ROM 303 may be flash memory.

The storage device 304 stores application data, program modules and other information. One or more program modules stored in the storage device 304 are configured to cause various operations and processes described herein to be executed. For example, in some embodiments, the storage device 304 stores instructions for generating and providing to a computing system a web page including an embedded executable program which, when executed on the computing system, is operable to obtain a ticket-granting ticket stored on the computing system and send the ticket-granting ticket to another computing system; determining whether a user associated with the ticket-granting ticket is authorized to access a protected resource comprising a web page; or a combination of these, in accordance with embodiments described herein. In some embodiments, the application 102 resides on the storage device 304 and executes on the image processing device 300.

The storage device 304 also stores other programs and data to be processed. For example, the storage device 304 stores an operating system including programs and data for managing hardware and software components of the image processing device 300. Applications on the image processing device 300 may utilize the operating system to perform various operations. The storage device 304 may further store other programs and/or drivers that enable various functions of the image processing device 300, graphical user interface (GUI) functions, and/or processor functions. The storage device 304 may also store data files including, for example, image data, user data, configuration information, GUI components, such as graphical elements or templates, or other data required by the image processing device 300.

In some embodiments, the image processing device 300 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 300. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 305 provides output signals to and receives input signals from an operation panel 306. Regarding the output signals, the operation panel interface 305 provides GUI data to the operation panel 306 for display on a liquid crystal display (LCD). Regarding the input signals, the operation panel interface 305 receives input signals based on user input operations at the operation panel 306 and relays the input signals to the processor(s) 301. In some embodiments, the operation panel 306 includes a touch sensitive element operable to receive user input operations or commands based on the touching of graphical objects displayed on the LCD. In some embodiments, the operation panel 306 includes a hard key panel.

The image processing device 300 includes one or more input/output (I/O) port(s) 307. The I/O port(s) 307 may include any suitable interface type such as a universal serial bus (USB) port, FireWire port (IEEE-1394), serial port, parallel port, or AC/DC power connection port. The I/O port(s) 307 enable one or more external device(s) 308 to communicate with the image processing device 300 when the external device(s) 308 is/are connected to the I/O port(s) 307. Examples of external devices 308 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 309 includes hardware, software, or both providing one or more interfaces for communication (such as, for example, packet-based communication) between the image processing device 300 and one or more other computing systems or one or more networks 310. As an example and not by way of limitation, the network interface 309 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 309 for it. As an example and not by way of limitation, the image processing device 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 300 may communicate with a wireless PAN (WPAN) (such as, for example, a BLUETOOTH WPAN), a WI-FI network, a WI-MAX network, or other suitable wireless network or a combination of two or more of these. The image processing device 300 may include any suitable network interface 309 for any of these networks 310, where appropriate.

A system bus 311 interconnects various components of the image processing device 300 thereby enabling the transmission of data and execution of various processes. The system bus 311 may include one or more types of bus structures including a memory bus or memory controller, a peripheral bus, and a local bus using any of a variety of bus architectures.

The device interface 312 is connected to the scanner unit 313 and to the printer unit 314. The device interface 312 performs synchronous/asynchronous conversion of image data.

The scanner unit 313 includes a light source and an image sensor. The scanner unit 313 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 313 includes an optical system (for example, mirrors, lens) that directs the light to the image sensor. After the image sensor generates the electrical signals, an analog-to-digital converter converts the electrical signals to digital image data representing the scanned physical document. The scanner unit 313 then outputs the digital image data to one or more other components of the image processing device 300 via the device interface 312.

The printer unit 314 is an image output device for printing on a sheet an image corresponding to image data. In response to a print command received at the image processing device 300, the printer unit 314 receives image data via the device interface 312 and outputs to a sheet an image corresponding to the image data.

Figure 4:
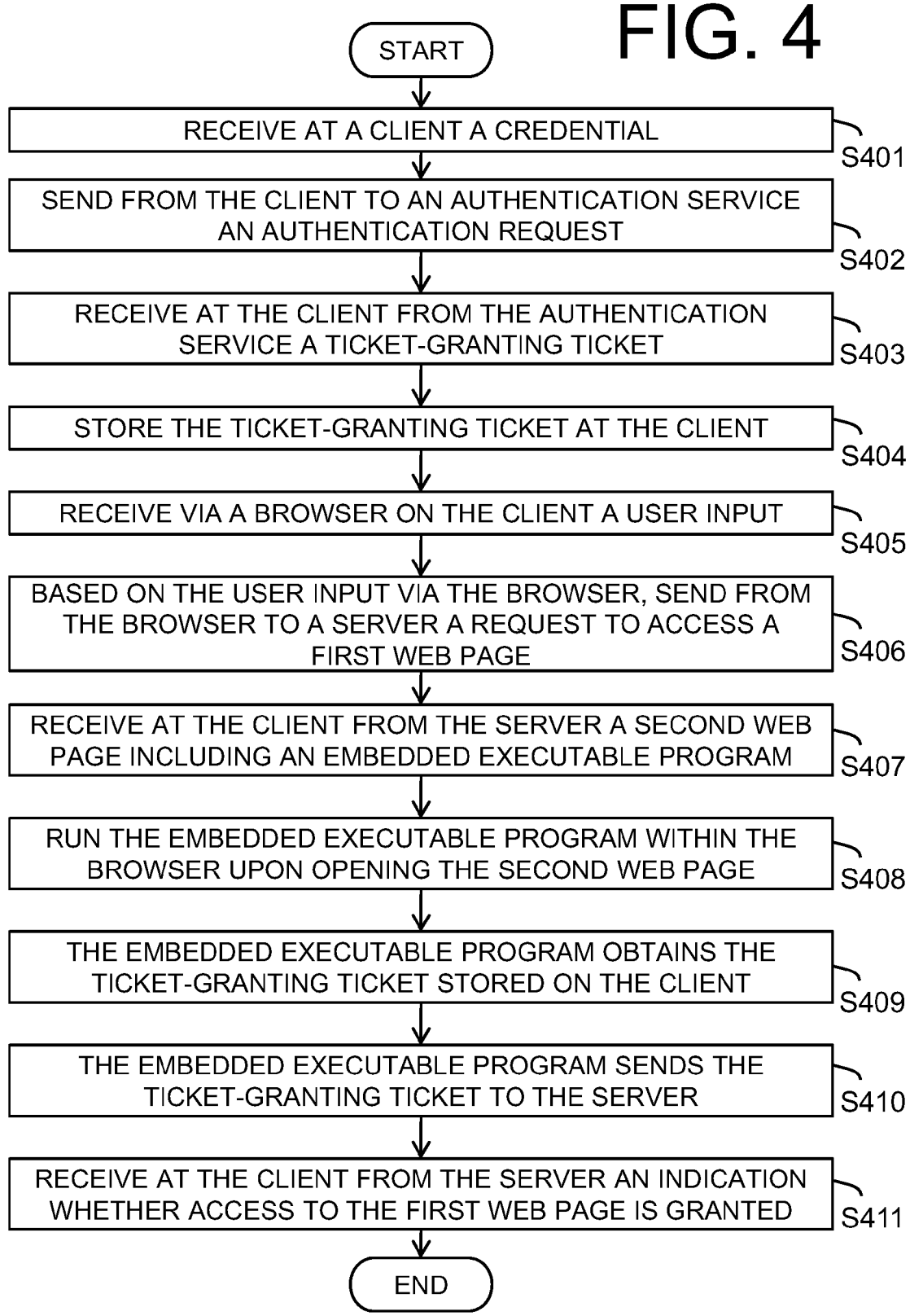
FIG. 4 illustrates an example flow of operations at a client computing system.
Figure 5:
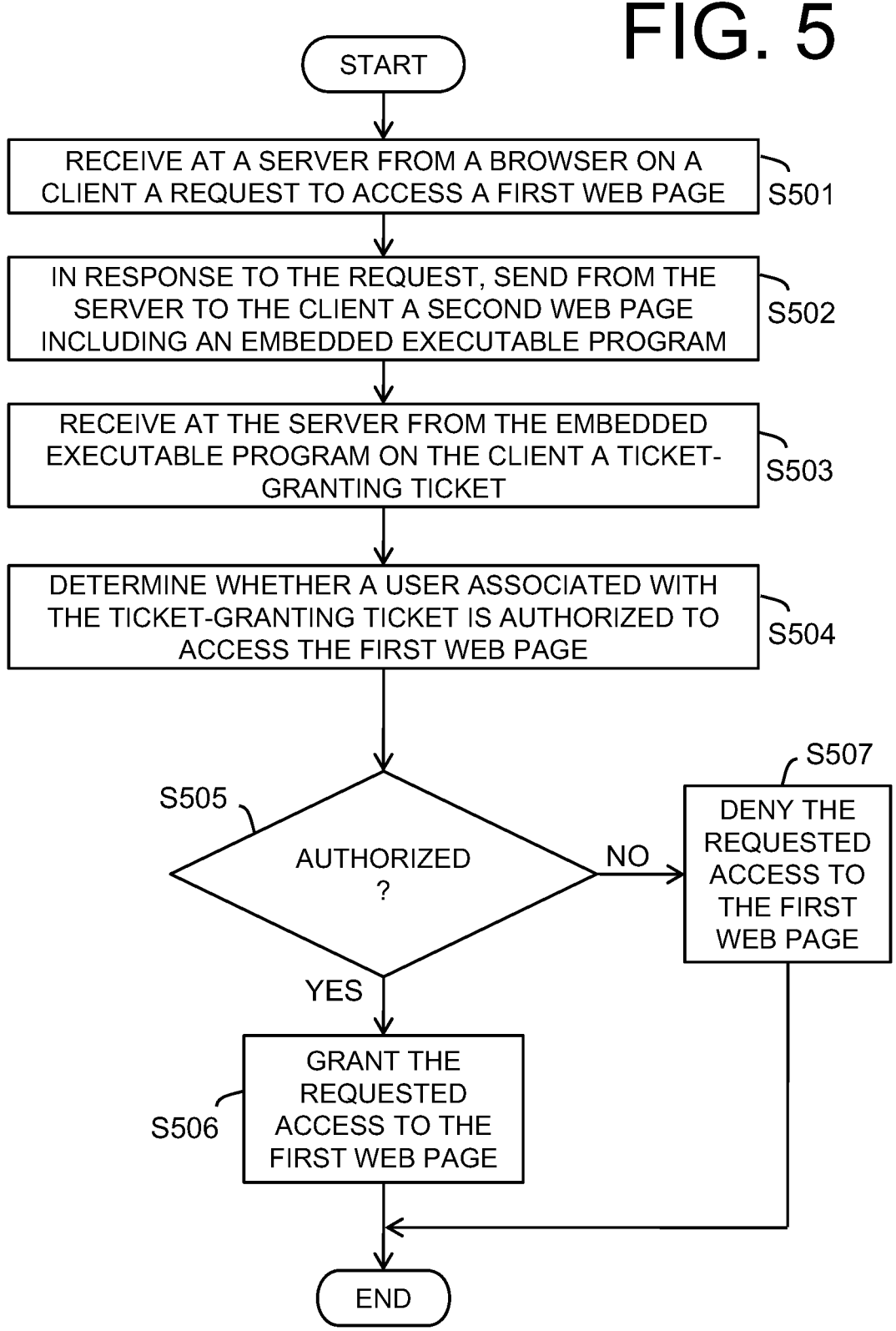
FIG. 5 illustrates an example flow of operations at a server computing system.
Figure 6:
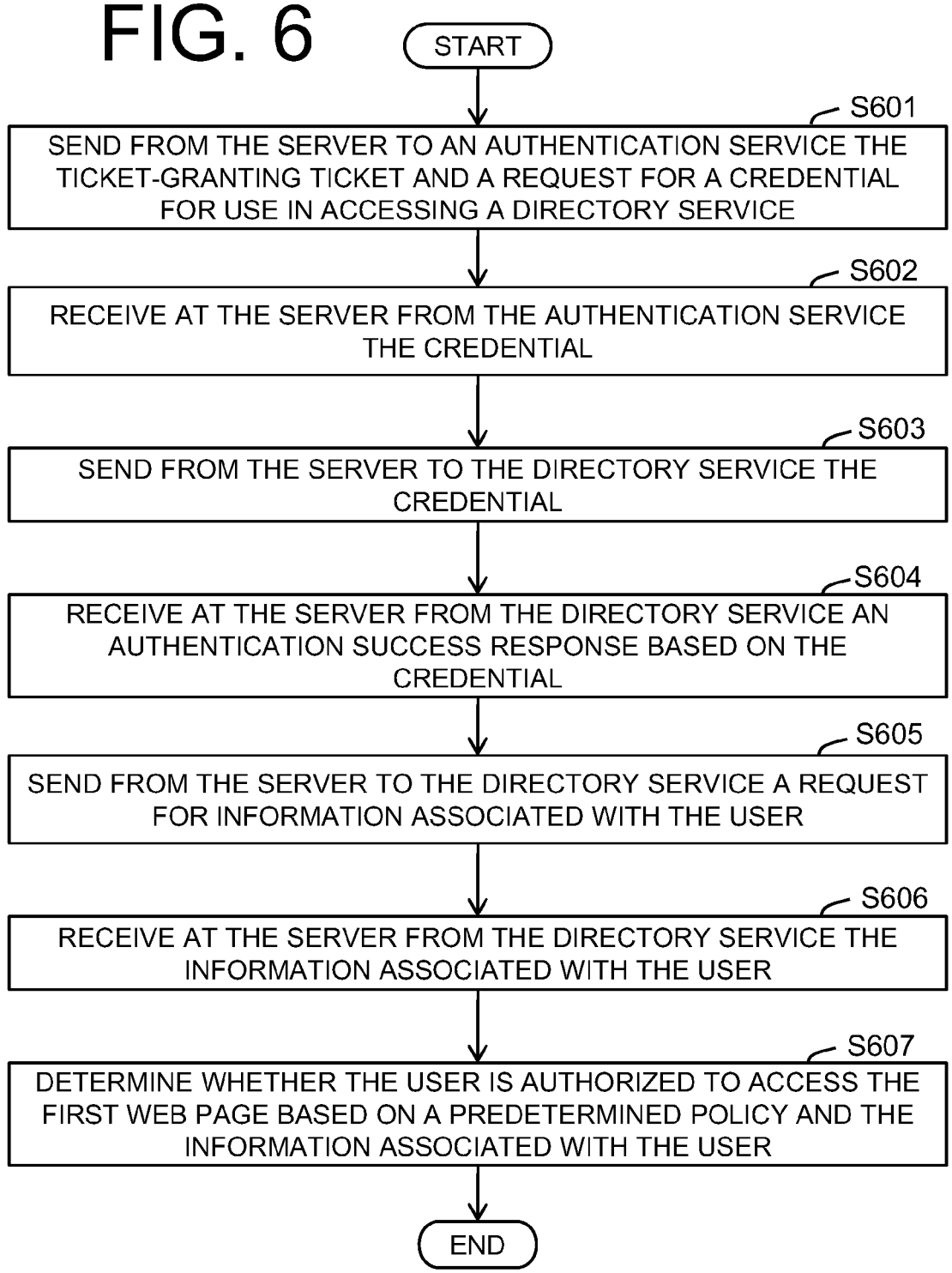
FIG. 6 illustrates an example flow of operations at the server computing system of FIG. 5.

FIGS. 4-6 are described with reference to the example network environment of FIG. 1. FIG. 4 illustrates an example flow of operations at the client computing system 103. FIG. 5 and FIG. 6 each illustrate an example flow of operations at the server computing system 101.

In step S401, the client computing system 103 receives a credential. For example, a user may provide the credential via an I/O interface of the client computing system 103 in order to log on to the client computing system 103 connected to the network 109. The credential may be one or a combination of a username, password, a smart card, a PIN, biometric information, certificate, or other information to authenticate the identity of the user. The credential may include a shared secret known to the user and the authentication service 107. In some embodiments, the client computing system 103 also receives information indentifying a domain to which the user belongs.

In the present embodiment, the client computing system 103 uses a Kerberos protocol for network logon operations on behalf of the user. The client computing system 103 may perform a one-way encryption function on a credential, such as a password, to create a cryptographic key for communications with the authentication service 107. In step S402, the client computing system 103 sends an authentication request to the authentication service 107. The authentication request may be a cleartext message that identifies the user but does not include secret information, such as a password. In step S403, the client computing system 103 receives a ticket-granting ticket from the authentication service 107. In step S404, the client computing system 103 stores the ticket-granting ticket.

The client computing system 103 may store the ticket-granting ticket in memory on the client computing system 103. For example, the ticket-granting ticket may be stored in a cache, such as a credentials cache, which may be located in an area of volatile memory. The client computing system 103 may store the ticket-granting ticket in a file system, which may be on a hard disk drive or other storage device.

In the present embodiment, the authentication service 107 implements a Kerberos authentication mechanism. For example, the authentication service 107 receives the authentication request sent in step S402 and performs operations using the Kerberos protocol to verify an identity of the user of the client computing system 103. The authentication service 107 may refer to user identification information included in the authentication request and search the database 108 for a user account based on the identification information. The user account may comprise an object and its attributes stored in the database 108. The attributes may include a cryptographic key generated from a shared secret, such as a password, known to the user and the authentication service 107. The cryptographic key may be used for communications with the client computing system 103 and to verify the user's identity.

If the authentication service 107 successfully authenticates the user's identity, the authentication service 107 generates the ticket-granting ticket and sends the ticket-granting ticket and a session key to the client computing system 103. The ticket-granting ticket is a time-limited cryptographic message used in a Kerberos or other authentication process to authenticate an identity. The authentication service 107 encrypts the ticket-granting ticket using a key held by the authentication service 107. Once the ticket-granting ticket is stored at the client computing system 103 in step S404, the client computing system 103 may later present the ticket-granting ticket back to the authentication service 107 to receive a service ticket. Using the key that the authentication service 107 used to encrypt the ticket-granting ticket, the authentication service 107 may decrypt the ticket-granting ticket to obtain information for verifying the user's identity. The authentication service 107 may then provide the service ticket back to the client computing system 103. By way of example, and not by way of limitation, the ticket-granting ticket may include the session key, user identification information (for example, an identifier for the user's account in the database 108), location information of the client computing system 103, an indication of the duration of the ticket-granting ticket's validity, and information associated with the user (for example, identifier(s) for the group(s) to which the user belongs, the user's privileges, or other information).

In step S405, the client computing system 103 receives a user input operation via the browser 104. For example, the user may input a uniform resource identifier (URI), or may click a hypertext link within a browser window. The URI or the hypertext link may identify a resource such as an application, an object, a document, a page, a file, executable code, or other computational resource. In step S406, based on the user input, the browser 104 sends a request to access a web page identified by the URI or the hypertext link. In some embodiments, the browser 104 sends to the server computing system 101 a request to access a first web page.

In step S501, the server computing system 101 receives from the browser 104 on the client computing system 103 the request to access the first web page. In some embodiments, the first web page is a protected resource for which access is controlled or restricted such that only authenticated and authorized entities may gain access. In some embodiments, the first web page is a configuration web page, such as described with respect to FIG. 7.

In step S502, in response to receiving the request, the server computing system 101 sends to the client computing system 103 a second web page. The second web page includes an embedded executable program configured to run within the browser 104 on the client computing system 103. The embedded executable program, when executed on the client computing system 103, is operable to obtain a ticket-granting ticket stored on the client computing system 103 and send the ticket-granting ticket to the server computing system 101.

The embedded executable program may be an applet, plug-in, or other software module. In some embodiments, the embedded executable program is a JAVA applet. In some embodiments, the embedded executable program is a signed JAVA applet. The executable program may be stored as a file within the server computing system 101. In response to receiving the request to access the first web page, the server computing system 101 generates the second web page by retrieving the executable program and embedding the executable program within an HTML web page. In some embodiments, the second web page may be presented to the user via the browser 104 during an authorization process in which the server computing system 101 determines whether the user is authorized to access the first web page.

The embedded executable program is executable within a virtual machine that is supported by a client application, such as a browser. A browser loads the embedded executable program as part of its normal interpretation and processing of the web page in which the executable program is embedded. The embedded executable program, when executed on the client computing system 103, may be operable to obtain content, such as tokens, credentials, certificates or other data, stored on the client computing system 103. For example, the embedded executable program may access a cache, such as a credentials cache, or other memory location and retrieve one or more of the contents therein. Further by way of example, the embedded executable program may access a file system, which may be on a hard disk drive or other storage device, and retrieve one or more of the contents therein. In some embodiments, the embedded executable program is operable to obtain data for use in a Kerberos authentication process. For example, the embedded executable program may obtain one or more of a ticket-granting ticket, a session key, identification information (for example, a security identifier), or other data.

A user may need to grant permission for the embedded executable program to access data. For example, software running on the client computing system 103 may require that a user grant permission for one or more operations of the embedded executable program before allowing the embedded executable program to perform those operations on the client computing system 103. A virtual machine or other software running in the browser 104 may prompt the user to grant or deny this permission. Information indicating whether permission has been granted or denied may be saved on the client computing system 103. For example, permission decisions or configurations may be stored in a policy file or other location and referenced when the embedded executable program begins to execute on the client computing system 103. Accordingly, in some cases a user may be prompted to grant or deny permission when the embedded executable program is initially executed, but the user may not be prompted when the embedded executable program is subsequently executed.

The embedded executable program is operable to send data (for example, content obtained from the client computing system 103) to the server computing system 101. For example, the embedded executable program sends the ticket-granting ticket to the server computing system 101. The embedded executable program may send other data to the server computing system 101, such as identification information of the user, the session key provided to the client computing system 103 by the authentication service 107, or other data.

In some embodiments, the embedded executable program is operable to cause a secure connection to be established for communications between the embedded executable program and the server computing system 101. In some embodiments, the embedded executable program sends the ticket-granting ticket to the server computing system 101 over the secure connection. The embedded executable program may send other data to the server computing system 101 over the secure connection. The embedded executable program may cause the secure connection to be established using the secure socket layer (SSL) protocol or the transport layer security (TLS) protocol. For example, a private encryption key may be used to encrypt data that is transferred over an SSL connection.

In step S407, the client computing system 103 receives from the server computing system 101 the second web page including the embedded executable program. In step S408, the embedded executable program runs within the browser 104 on client computing system 103 upon opening the second web page. The browser 104 loads the embedded executable program as part of its normal interpretation and processing of the second web page. The browser 104 supports a runtime environment for execution of the embedded executable program. For example, the browser 104 may incorporate a virtual machine, such as a JAVA virtual machine, which executes the embedded executable program.

In step S409, the embedded executable program obtains the ticket-granting ticket stored in step S404. In some embodiments, in addition to the ticket-granting ticket, the embedded executable program also obtains one or both of the following: (1) the session key (which was provided to the client computing system 103 by the authentication service 107 in connection with the ticket-granting ticket); and (2) the user identification information (which was provided to the authentication service 107 by the client computing system 103 in connection with the authentication request in step S402). In some embodiments, the embedded executable program obtains some other combination of data that includes the ticket-granting ticket. The embedded executable program may obtain data in step S409 from one or multiple locations, such as cache(s), file system(s), or other memory or storage location(s). In step S409, the embedded executable program is executing on the client computing system 103.

In step S410, the embedded executable program sends the data obtained in step S409 to the server computing system 101. In some embodiments, the embedded executable program causes a secure connection to be established for communications between the embedded executable program and the server computing system 101. In some embodiments, the embedded executable program sends the data obtained in step S409 to the server computing system 101 over the secure connection. In step S410, the embedded executable program is executing on the client computing system 103.

In step S503, the server computing system 101 receives from the embedded executable program on the client computing system 103 the data sent in step S410. The data sent in step S410 at least includes the ticket-granting ticket, but may also include the session key, the user identification information, or other data. In some embodiments, the server computing system 101 receives the data sent in step S410 in an encrypted communication over a secure connection. By way of example, and not by way of limitation, the secure connection may have been established using the SSL protocol.

In step S504, the server computing system 101 determines whether a user associated with the ticket-granting ticket is authorized to access the first web page. The server computing system 101 may use the ticket-granting ticket to obtain access to information associated with the user. In some embodiments, the server computing system 101 uses the ticket-granting ticket to obtain a credential for use in accessing the directory service 106. In some embodiments, the server computing system 101 requests the directory service 106 perform a search operation using the LDAP protocol to search the database 108 for information associated with the user. Then, the server computing system 101 may determine whether the user is authorized to access the first web page based on a predetermined policy and the information associated with the user.

FIG. 6 illustrates an example flow of operations at the server computing system 101 for performing the step S504. In step S601, the server computing system 101 sends to the authentication service 107 the ticket-granting ticket and a request for a credential for use in accessing the directory service 106. The requested credential may be a service ticket, which is a time-limited cryptographic message for use in the Kerberos authentication system. The service ticket may be used to gain access to a secure service or application, such as the directory service 106. The server computing system 101 may use the service ticket to gain access to the directory service 106 without being required to respond to a challenge by the directory service 106, such as entering a valid combination of a user name and a password.

In some embodiments, step S601 includes the server computing system 101 sending to the authentication service 107 the ticket-granting ticket in conjunction with other information. For example, in conjunction with the ticket-granting ticket, the server computing system 101 may send a file that is encrypted with the session key obtained by the embedded executable program in step S409, according to some embodiments, and received by the server computing system 101 in step S503, according to some embodiments. The file encrypted with the session key may include a timestamp, user identification information (for example, the user identification information obtained by the embedded executable program in step S409, according to some embodiments, and received by the server computing system 101 in step S503, according to some embodiments), or other data. The authentication service 107 may use the ticket-granting ticket and the file encrypted with the session key to determine whether to issue the requested service ticket to the server computing system 101. For example, the authentication service 107 may decrypt the ticket-granting ticket to obtain the session key contained in the ticket-granting ticket. Then, using the session key the authentication service 107 obtained from the ticket-granting ticket, the authentication service 107 may decrypt the file encrypted with the session key. If decryption is successful, the authentication service 107 may evaluate the contents of the file. Based on the evaluation of the contents of the file, the authentication service 107 may then issue the requested service ticket to the server computing system 101.

In step S602, the server computing system 101 receives from the authentication service 107 the credential. For example, using the Kerberos protocol, the server computing system 101 receives a service ticket for use in accessing the directory service 106. In step S603, the server computing system 101 sends to the directory service 106 the credential. For example, using the Kerberos protocol, the server computing system 101 sends to the directory service 106 the service ticket the server computing system 101 received in step S602. In step S604, the server computing system 101 receives from the directory service 106 an authentication success response based on the credential. Based on successful authentication to the directory service 106, the server computing system 101 may now access services or operations provided by the directory service 106. For example, in some embodiments, the directory service 106 may perform a search operation using the LDAP protocol to search the database 108 for information associated with the user.

In step S605, the server computing system 101 sends to the directory service 106 a request for information associated with the user. For example, the server computing system 101 may request the directory service 106 to perform a search operation using the LDAP protocol to search the database 108 for information associated with the user. For example, the server computing system 101 may request the directory service 106 search the database 108 for group membership information. The group membership information indicates the group or groups to which the user belongs, such as an administrator group. In step S606, the server computing system 101 receives from the directory service 106 the information associated with the user. For example, the server computing system 101 may receive group membership information indicating the group or groups to which the user belongs.

In step S607, the server computing system 101 determines whether the user is authorized to access the first web page based on a predetermined policy and the information associated with the user received in step S606. For example, the server computing system 101 may grant or deny access to the first web page based on whether the information associated with the user received in step S606 satisfies predefined criteria. In some embodiments, the predetermined policy comprises granting a request to access a configuration web page from a user identified as a member of an administrator group, and denying a request to access the configuration web page from a user identified as not being a member of an administrator group. By way of example, and not by way of limitation, in some embodiments, the first web page is a web page for modifying configuration settings of the application 102. A user may be required to belong to an administrator group in order to access the first web page. But the user may not be required to belong to the administrator group in order to access some task-specific functionality of the application 102. Policies for controlling access to various resources of the server computing system 101 may be stored at the server computing system 101.

Once the server computing system 101 determines whether the user associated with the ticket-granting ticket is authorized to access the first web page, the process advances to step S505. At step S505, if the user associated with the ticket-granting ticket is authorized to access the first web page (yes at step S505), the process advances to step S506. On the other hand, if the user associated with the ticket-granting ticket is not authorized to access the first web page (no at step S505), the process advances to step S507.

In step S506, in response to determining that the user is authorized to access the first web page, the server computing system 101 grants the requested access to the first web page. In some embodiments, the server computing system 101 grants the requested access to the first web page by sending to the client computing system 103 information indicating the requested access is granted. For example, the server computing system 101 may send the information indicating the requested access is granted to the embedded executable program on the client computing system 103. Then, the embedded executable program may prompt the browser 104 to reissue the request to access the first web page. The browser 104 may then send to the server computing system 101 a request to access the first web page. In response to receiving the request to access the first web page, the server computing system 101 then sends to the client computing system 103 the first web page.

In step S507, in response to determining that the user is not authorized to access the first web page, the server computing system 101 denies the requested access to the first web page. In some embodiments, the server computing system 101 denies the requested access to the first web page by sending to the client computing system 103 information indicating the requested access is denied. For example, the server computing system 101 may send the information indicating the requested access is denied to the embedded executable program on the client computing system 103. Then, the embedded executable program may prompt the browser 104 to issue a request for a web page. The browser 104 may then send to the server computing system 101 a request to access the web page. In response to receiving the request to access the web page, the server computing system 101 then sends to the client computing system 103 a web page indicating the access to the first web page is denied.

At step S411, the client computing system 103 receives from the server computing system 101 an indication whether access to the first web page is granted. For example, in a case it is determined that the user is authorized to access the first web page, the client computing system 103 receives from the server computing system 101 the information sent by the server computing system 101 in step S506. On the other hand, at step S411, in a case it is determined that the user is not authorized to access the first web page, the client computing system 103 receives from the server computing system 101 the information sent by the server computing system 101 in step S507.

In some embodiments, various steps described above are performed over a period of time without requiring a user input operation for the duration of the period. For example, referring to FIG. 5, in some embodiments, the server computing system 101 performs the following steps all over a period of time without requiring a user input operation for the duration of the period: receive from the client computing system 103 the request to access the first web page (step S501), send to the client computing system 103 the second web page including the embedded executable program (step S502), receive the ticket-granting ticket from the embedded executable program on the client computing system 103 (step S503), determine whether the user is authorized to access the first web page (step S504), and grant the requested access to the first web page in a case the server computing system determines the user is authorized to access the first web page (steps S505 and S506).

By way of example, a user of the client computing system 103 may provide a user input at the browser 104 as described with respect to step S405, and the above-described steps S501 to S506 may be performed at the server computing system 101 over a period of time without requiring a user input operation for the duration of the period. One such example is described with reference to FIG. 7.

Figure 7:
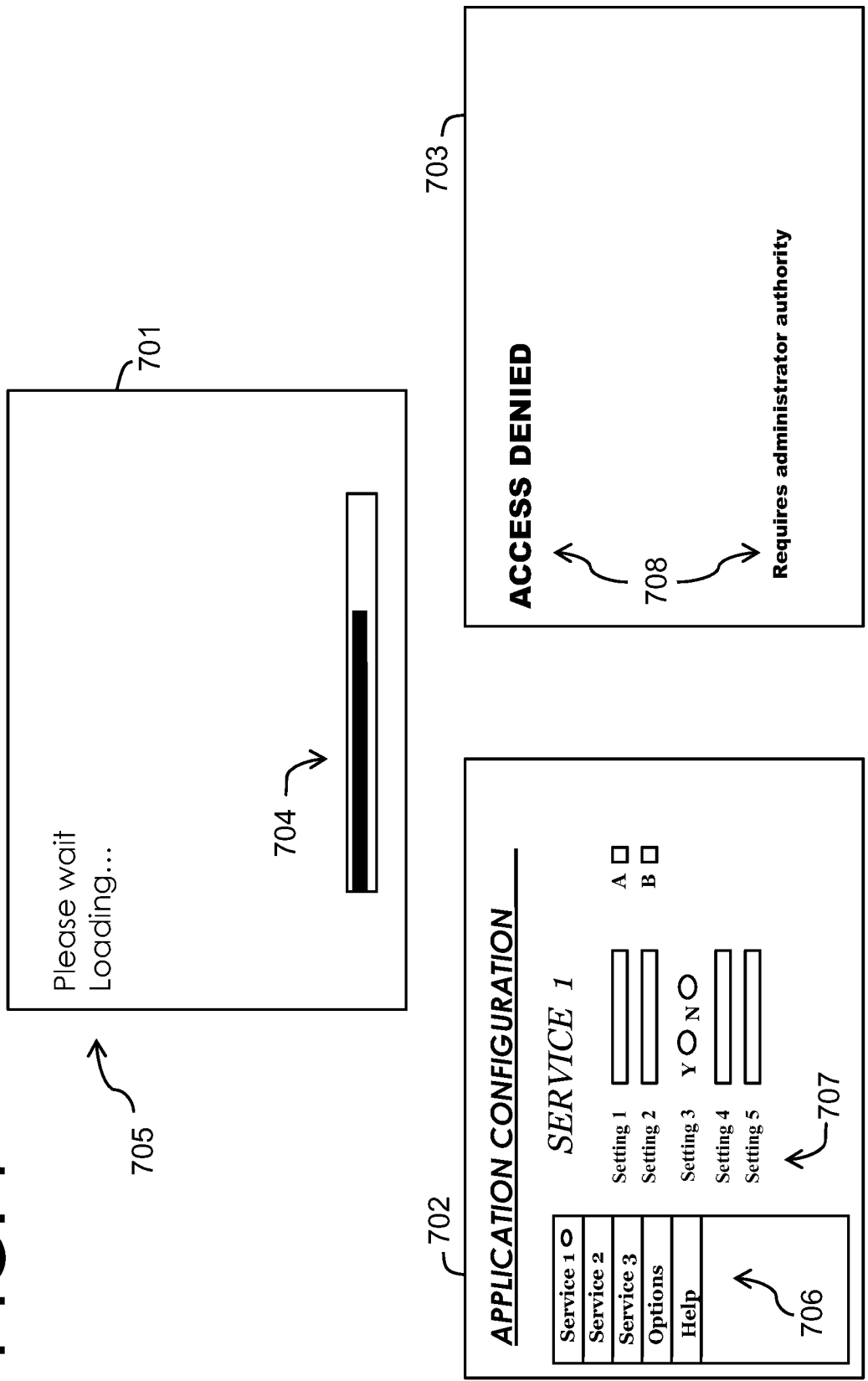
FIG. 7 illustrates example displayed web pages.

FIG. 7 illustrates example displayed web pages. Web page 701 is an example of the second web page described herein. Web page 702 is an example of the first web page described herein. When the user provides a user input at the browser 104, the browser 104 may send to the server computing system 101 a request for the web page 702. In response, the server computing system 101 sends the web page 701. The web page 701 includes the executable program embedded therein, as described with respect to step S502. The web page 701 is presented to the user via the browser 104 during an authorization process in which the server computing system 101 determines whether the user is authorized to access the web page 702. The web page 701 may include a graphic 704 to indicate the progress of the authorization process. The web page 701 may include textual information 705 to indicate the requested web page is loading or to indicate the authorization process is ongoing, or some other message. The authorization process as described with respect to FIG. 5 is executed by the server computing system 101 while the browser 104 presents web page 701 to the user. If the server computing system 101 determines the user is authorized to access web page 702, then processing described with respect to step S506 is executed. The user is then presented with the web page 702.

Web page 702 is an example of a configuration web page. In some embodiments, a user is granted access to the web page 702 when the server computing system 101 determines the user belongs to an administrator group. The user must belong to the administrator group because web page 702 provides access to configuration settings with respect to an application running on the server computing system 101. Web page 702, for example, includes a menu 706 to switch between various services the application provides. The web page displayed for each service listed in the menu 706 provides a web page with web forms configured to receive user inputs for various settings 707. Thus, a user that obtains access to the web page 702 may change settings 707 with respect to the various services listed in the menu 706. Accordingly, access to the web page 702 may be restricted to those users who belong to the administrator group.

In some embodiments, once the user provides the user input at the browser 104 as described with respect to step S405, the above-described steps S501 to S506 may be performed at the server computing system 101 over a period of time without requiring a user input operation for the duration of the period. While the server computing system 101 is performing the processing with respect to steps S501 to S506, the user may be presented with web page 701 and, subsequently, web page 702 in the manner described above. Accordingly, the user would not be required to provide any further user input operation after the initial user input described with respect to step S405.

If the server computing system 101 determines the user is not authorized to access web page 702, then processing described with respect to step S507 is executed. The user is then presented with the web page 703. Web page 703 may include textual information 708 to indicate access to the requested web page is denied. The web page 703 may further include textual information 708 to indicate the required level of authority necessary to access the web page 702.

Figure 8:
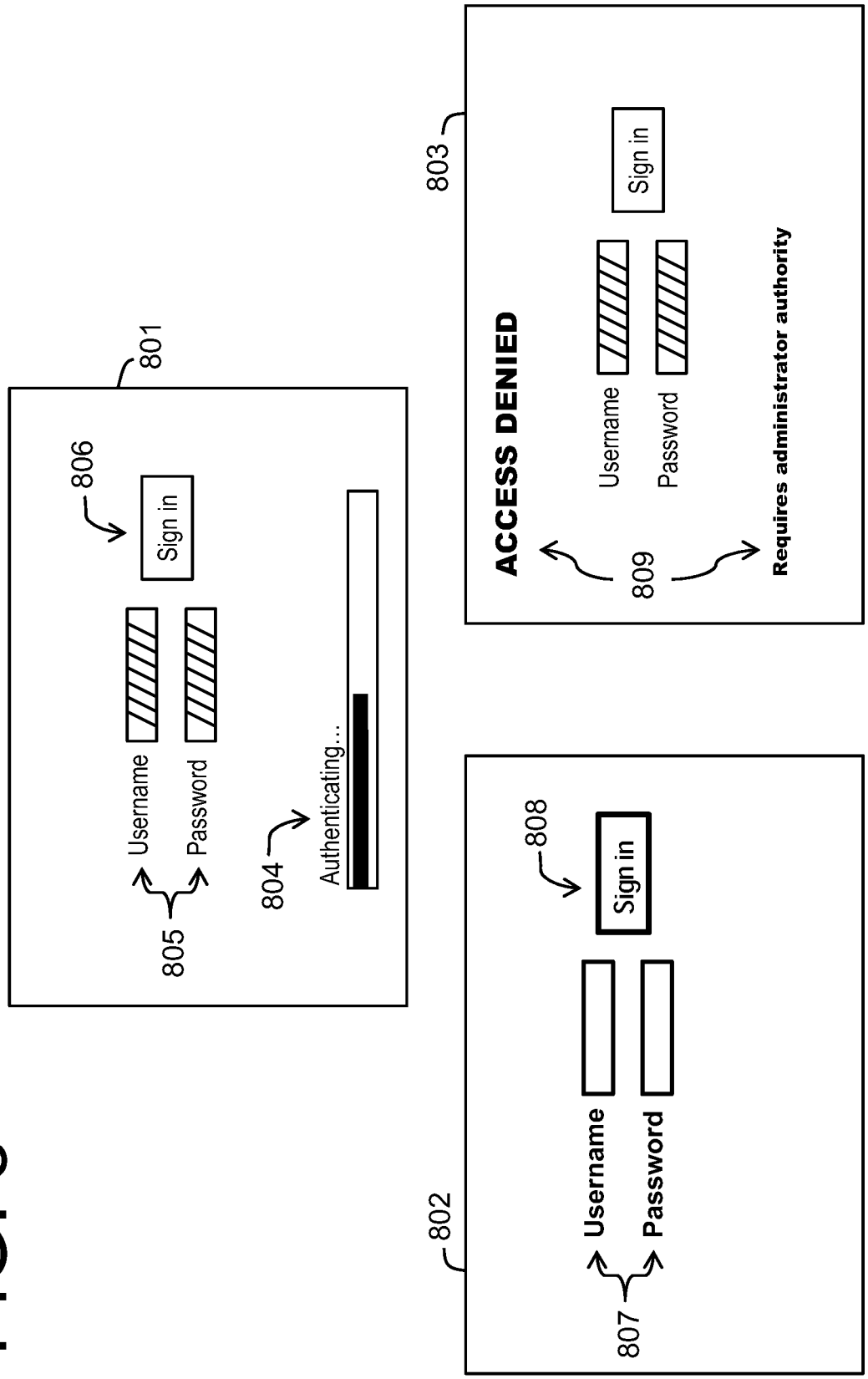
FIG. 8 illustrates example displayed web pages.

FIG. 8 illustrates example displayed web pages according to another embodiment. In the embodiment described with respect to FIG. 8, before permitting the user to attempt to sign in to the first web page described herein, the server computing system 101 first determines whether the user is authorized to access the first web page based on the authorization process described with respect to FIG. 5. Web page 801 is an example of the second web page described herein. Web page 802 is an example of a sign in page for accessing the first web page described herein. When the user provides a user input at the browser 104, the browser 104 may send to the server computing system 101 a request for the first web page described herein. In response, the server computing system 101 sends the web page 801. The web page 801 includes the executable program embedded therein, as described with respect to step S502. The web page 801 is presented to the user via the browser 104 during an authorization process in which the server computing system 101 determines whether the user is authorized to access the first web page described herein. The web page 801 may include a graphic 804 to indicate the progress of the authorization process. The web page 801 may include username and password input forms 805 and a sign in button 806 that are disabled while the authorization process is ongoing. The authorization process as described with respect to FIG. 5 is executed by the server computing system 101 while the browser 104 presents web page 801 to the user. If the server computing system 101 determines the user is authorized to access the first web page described herein, then processing described with respect to step S506 is executed. The user is then presented with the web page 802.

Web page 802 is an example of a sign in page for accessing the first web page described herein. In some embodiments, a user is granted access to the web page 802 when the server computing system 101 determines the user belongs to an administrator group. The user must belong to the administrator group because web page 802 is a sign in page for accessing the first web page described herein. The web page 802 is similar to the web page 801 except the web page 802 includes the username and password input forms 807 and a sign in button 808 that are enabled. Accordingly, a user may now access the username and password input forms 807 and the sign in button 808 in order to sign in to the first web page by providing valid username and password credentials.

If the server computing system 101 determines the user is not authorized to access the first web page described herein, then processing described with respect to step S507 is executed. The user is then presented with the web page 803. Web page 803 may include textual information 809 to indicate access to the requested web page is denied. The textual information 809 may further indicate the required level of authority necessary to access the first web page described herein. Furthermore, the username and password web forms and the sign in button of web page 803 remain disabled as with web page 801, thus preventing the user from even attempting to sign in to the first web page described herein.

Various above-described operations performed by the server computing system 101 may be executed and/or controlled by one or more applications running on the server computing system 101. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable storage medium storing instructions which, when executed by one or more processors, cause the one or more processors to perform one or more embodiments of the invention described herein. The scope of the present invention includes a computer-readable storage medium storing instructions which, when executed by one or more processors, cause the server computing system 101 to perform one or more embodiments of the invention described herein.

Examples of a computer-readable storage medium include a floppy disk, a hard disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method comprising:
receiving, at an image processing device from a browser on a client computing system, a request to access a first web page;
in response to the receiving the request, sending, from the image processing device to the client computing system, a second web page including an embedded executable program configured to run within the browser on the client computing system, wherein the embedded executable program, when executed on the client computing system, is operable to obtain a ticket-granting ticket stored on the client computing system and send the ticket-granting ticket to the image processing device, and wherein the ticket-granting ticket contains a cryptographic key usable by an authentication service to determine whether to issue a credential for use in accessing a service;
receiving, at the image processing device from the embedded executable program on the client computing system, the ticket-granting ticket;
using the ticket-granting ticket to obtain information associated with a user from a directory service, the user associated with the ticket-granting ticket;
determining whether the user is authorized to access the first web page based on the information associated with the user; and
in response to determining that the user is authorized to access the first web page, granting access to one or more web page elements configured to, when displayed by the browser on the client computing system, receive one or more user inputs for attempting to sign in to the first web page.

2. The method of claim 1, wherein in response to determining that the user is not authorized to access the first web page, denying the requested access to the first web page.

3. The method of claim 1, wherein the embedded executable program comprises a signed Java applet.

4. The method of claim 1, wherein the receiving the request, the sending the second web page, the receiving the ticket-granting ticket, the using the ticket-granting ticket to obtain the information associated with the user from the directory service, the determining whether the user is authorized to access the first web page, and the granting the access to the one or more web page elements are performed over a period of time without requiring a user input operation for the duration of the period.

5. The method of claim 1, wherein the receiving the ticket-granting ticket comprises receiving the ticket-granting ticket in an encrypted communication over a secure connection.

6. The method of claim 1, wherein the first web page comprises a configuration web page for configuring an application on the image processing device.

7. The method of claim 1, wherein the determining whether the user is authorized to access the first web page comprises determining whether the user is authorized to access the first web page based on a predetermined policy and the information associated with the user, the information associated with the user comprising group membership information.

8. The method of claim 7, wherein the predetermined policy comprises granting a request to access a configuration web page from a user identified as a member of an administrator group, and denying a request to access the configuration web page from a user identified as not being a member of an administrator group.

9. The method of claim 1, wherein the using the ticket-granting ticket to obtain the information associated with the user comprises:
sending, from the image processing device to the authentication service, the ticket-granting ticket and a request for a credential for use in accessing the directory service;
receiving, at the image processing device from the authentication service, the credential for use in accessing the directory service;
sending, from the image processing device to the directory service, the credential for use in accessing the directory service;
receiving, at the image processing device from the directory service, an authentication success response based on the credential for use in accessing the directory service;
sending, from the image processing device to the directory service, a request for the information associated with the user; and
receiving, at the image processing device from the directory service, the information associated with the user.

10. The method of claim 1, further comprising:
receiving, at the image processing device from the browser on the client computing system, a credential based on one or more user inputs to the one or more web page elements;
determining whether the credential based on the one or more user inputs to the one or more web page elements is valid; and
in response to determining that the credential based on the one or more user inputs to the one or more web page elements is valid, granting access to the first web page.

11. A non-transitory computer-readable storage medium storing instructions which, when executed by one or more processors, cause the one or more processors to perform operations comprising:
receiving, at an image processing device from a browser on a client computing system, a request to access a first web page;
in response to the receiving the request, sending, from the image processing device to the client computing system, a second web page including an embedded executable program configured to run within the browser on the client computing system, wherein the embedded executable program, when executed on the client computing system, is operable to obtain a ticket-granting ticket stored on the client computing system and send the ticket-granting ticket to the image processing device, and wherein the ticket-granting ticket contains a cryptographic key usable by an authentication service to determine whether to issue a credential for use in accessing a service;
receiving, at the image processing device from the embedded executable program on the client computing system, the ticket-granting ticket;
using the ticket-granting ticket to obtain information associated with a user from a directory service, the user associated with the ticket-granting ticket;

determining whether the user is authorized to access the first web page based on the information associated with the user; and in response to determining that the user is authorized to access the first web page, granting access to one or more web page elements configured to, when displayed by the browser on the client computing system, receive one or more user inputs for attempting to sign in to the first web page.

12. A system comprising:
one or more processors; and
memory coupled to the one or more processors and operable for storing instructions which, when executed by the one or more processors, cause the one or more processors to perform operations comprising:
  receiving, at an image processing device from a browser on a client computing system, a request to access a first web page;
  in response to the receiving the request, sending, from the image processing device to the client computing system, a second web page including an embedded executable program configured to run within the browser on the client computing system, wherein the embedded executable program, when executed on the client computing system, is operable to obtain a ticket-granting ticket stored on the client computing system and send the ticket-granting ticket to the image processing device, and wherein the ticket-granting ticket contains a cryptographic key usable by an authentication service to determine whether to issue a credential for use in accessing a service;
  receiving, at the image processing device from the embedded executable program on the client computing system, the ticket-granting ticket;
  using the ticket-granting ticket to obtain information associated with a user from a directory service, the user associated with the ticket-granting ticket;
  determining whether the user is authorized to access the first web page based on the information associated with the user; and
  in response to determining that the user is authorized to access the first web page, granting access to one or more web page elements configured to, when displayed by the browser on the client computing system, receive one or more user inputs for attempting to sign in to the first web page.

13. The system of claim 12, wherein in response to determining that the user is not authorized to access the first web page, denying the requested access to the first web page.

14. The system of claim 12, wherein the embedded executable program comprises a signed Java applet.

15. The system of claim 12, wherein the receiving the request, the sending the second web page, the receiving the ticket-granting ticket, the using the ticket-granting ticket to obtain the information associated with the user from the directory service, the determining whether the user is authorized to access the first web page, and the granting the access to the one or more web page elements are performed over a period of time without requiring a user input operation for the duration of the period.

16. The system of claim 12, wherein the receiving the ticket-granting ticket comprises receiving the ticket-granting ticket in an encrypted communication over a secure connection.

17. The system of claim 12, wherein the first web page comprises a configuration web page for configuring an application on the image processing device.

18. The system of claim 12, wherein the determining whether the user is authorized to access the first web page comprises determining whether the user is authorized to access the first web page based on a predetermined policy and the information associated with the user, the information associated with the user comprising group membership information.

19. The system of claim 18, wherein the predetermined policy comprises granting a request to access a configuration web page from a user identified as a member of an administrator group, and denying a request to access the configuration web page from a user identified as not being a member of an administrator group.

20. The system of claim 12, wherein the using the ticket-granting ticket to obtain the information associated with the user comprises:
  sending, from the image processing device to the authentication service, the ticket-granting ticket and a request for a credential for use in accessing the directory service;
  receiving, at the image processing device from the authentication service, the credential for use in accessing the directory service;
  sending, from the image processing device to the directory service, the credential for use in accessing the directory service;
  receiving, at the image processing device from the directory service, an authentication success response based on the credential for use in accessing the directory service;
  sending, from the image processing device to the directory service, a request for the information associated with the user; and
  receiving, at the image processing device from the directory service, the information associated with the user.

21. The system of claim 12, the operations further comprising:
  receiving, at the image processing device from the browser on the client computing system, a credential based on one or more user inputs to the one or more web page elements;
  determining whether the credential based on the one or more user inputs to the one or more web page elements is valid; and
  in response to determining that the credential based on the one or more user inputs to the one or more web page elements is valid, granting access to the first web page.

* * * * *